United States Patent
Senge

(10) Patent No.: US 8,505,262 B2
(45) Date of Patent: Aug. 13, 2013

(54) VEHICLE GLAZING HAVING A TRIM MOUNTED THEREON

(75) Inventor: Christoph Senge, Dillingen (DE)

(73) Assignee: Pilkington Italia S.p.A., San Salvo CH (IT)

( * ) Notice: Subject to any disclaimer, the term of this patent is extended or adjusted under 35 U.S.C. 154(b) by 188 days.

(21) Appl. No.: 12/725,498

(22) Filed: Mar. 17, 2010

(65) Prior Publication Data

US 2010/0237644 A1 Sep. 23, 2010

(30) Foreign Application Priority Data

Mar. 17, 2009 (EP) .................................... 09425107

(51) Int. Cl.
*B60J 10/02* (2006.01)
*B60J 10/00* (2006.01)
*B23P 17/04* (2006.01)

(52) U.S. Cl.
USPC ........ 52/716.5; 52/204.5; 52/208; 52/717.01; 296/1.08; 296/93; 296/146.15; 296/216.09

(58) Field of Classification Search
USPC ........ 52/716.5, 716.6, 716.1, 717.01, 717.05, 52/208, 716.7, 204.591, 204.597, 204.53, 52/204.5, 204.69, 204.369, 204.62; 296/1.08, 296/93, 146.15, 84.1, 96.21, 216.09
See application file for complete search history.

(56) References Cited

U.S. PATENT DOCUMENTS

| | | | |
|---|---|---|---|
| 3,720,030 A | 3/1973 | Krodel | |
| 3,783,568 A * | 1/1974 | Adler et al. | 52/204.597 |
| 3,811,989 A | 5/1974 | Hearn | |
| 3,897,967 A * | 8/1975 | Barenyi | 293/120 |
| 4,072,340 A | 2/1978 | Morgan | |
| 4,322,105 A | 3/1982 | Onda | |
| 4,332,412 A | 6/1982 | Nakazawa et al. | |
| 4,695,420 A | 9/1987 | Grawey | |
| 4,738,482 A * | 4/1988 | Bohm et al. | 296/216.09 |
| 4,833,847 A * | 5/1989 | Inayama et al. | 52/208 |
| 4,853,520 A * | 8/1989 | Hochart et al. | 219/535 |
| 4,858,988 A | 8/1989 | Morgan et al. | |
| 4,904,014 A | 2/1990 | Azarovitz et al. | |
| 4,916,873 A * | 4/1990 | Keys | 52/208 |
| 4,950,019 A * | 8/1990 | Gross | 296/93 |
| 4,984,839 A * | 1/1991 | Miyakawa et al. | 296/93 |
| 4,993,774 A * | 2/1991 | Greenhalgh et al. | 296/201 |
| 5,028,460 A | 7/1991 | Kimura et al. | |
| 5,050,928 A * | 9/1991 | Bohm et al. | 296/216.09 |
| 5,078,444 A * | 1/1992 | Shirahata et al. | 296/93 |
| 5,139,302 A * | 8/1992 | Kanke | 296/93 |
| 5,197,243 A | 3/1993 | Mazawa | |

(Continued)

FOREIGN PATENT DOCUMENTS

DE 2010564 A1 9/1971
DE 3432592 A1 3/1986

(Continued)

*Primary Examiner* — Basil Katcheves
*Assistant Examiner* — Rodney Mintz
(74) *Attorney, Agent, or Firm* — Marshall & Melhorn, LLC

(57) ABSTRACT

A vehicle glazing has a glazing profile provided around at least a portion of the periphery of a pane of glazing material. A rigid insert is embedded in the glazing profile, and a trim is mounted on the glazing profile, the trim engaging the insert and being retained by it. The insert is provided with at least one aperture through which the insert is engaged by at least one protrusion on the trim.

9 Claims, 3 Drawing Sheets

(56) References Cited

U.S. PATENT DOCUMENTS

| | | | |
|---|---|---|---|
| 5,248,179 A * | 9/1993 | Biermacher et al. | 296/146.15 |
| 5,316,829 A * | 5/1994 | Cordes et al. | 428/192 |
| 5,358,764 A | 10/1994 | Roberts et al. | |
| 5,433,038 A * | 7/1995 | Dupuy | 49/377 |
| 5,437,131 A * | 8/1995 | Tamura | 52/716.6 |
| 5,451,090 A * | 9/1995 | Brodie et al. | 296/192 |
| 5,456,874 A * | 10/1995 | Cordes et al. | 264/138 |
| 5,547,359 A * | 8/1996 | Cordes et al. | 425/125 |
| 5,580,628 A * | 12/1996 | Cordes et al. | 428/38 |
| 5,607,197 A * | 3/1997 | Yada | 296/93 |
| 5,695,236 A * | 12/1997 | Banno et al. | 296/96.21 |
| 5,786,047 A | 7/1998 | Tomblin | |
| 5,915,780 A * | 6/1999 | Kobrehel et al. | 296/146.15 |
| 5,927,040 A * | 7/1999 | Kuwabara | 52/716.8 |
| 5,935,356 A * | 8/1999 | Soldner | 156/71 |
| 6,022,063 A * | 2/2000 | Frost | 296/96.21 |
| 6,106,931 A * | 8/2000 | Ito et al. | 428/192 |
| 6,196,615 B1 * | 3/2001 | Yada | 296/93 |
| 6,238,769 B1 | 5/2001 | Nishio et al. | |
| 6,241,304 B1 * | 6/2001 | Frost | 296/96.21 |
| 6,287,406 B1 * | 9/2001 | Ito et al. | 156/106 |
| 6,409,244 B1 * | 6/2002 | Nagahashi et al. | 296/93 |
| 6,487,823 B2 * | 12/2002 | Lagrue | 52/208 |
| 6,546,683 B1 * | 4/2003 | Senge | 52/208 |
| 6,620,365 B1 | 9/2003 | Odoi | |
| 6,643,984 B2 * | 11/2003 | Kato et al. | 52/204.53 |
| 6,688,054 B2 * | 2/2004 | Pasterchick | 52/177 |
| 6,730,258 B1 | 5/2004 | Ohtake | |
| 6,787,085 B2 * | 9/2004 | Ito et al. | 264/138 |
| 6,803,001 B2 * | 10/2004 | Ito et al. | 264/138 |
| 6,810,635 B2 * | 11/2004 | Meizlish | 52/716.5 |
| 6,890,468 B2 * | 5/2005 | Caldoro et al. | 264/252 |
| 7,040,063 B2 * | 5/2006 | Leconte | 52/204.62 |
| 7,059,656 B2 * | 6/2006 | Mikkaichi et al. | 296/146.15 |
| 7,604,280 B2 * | 10/2009 | Katcherian | 296/96.21 |
| 7,837,251 B2 * | 11/2010 | Rich et al. | 296/146.15 |
| 7,905,071 B2 * | 3/2011 | Laconte | 52/717.01 |
| 7,918,058 B2 | 4/2011 | Debailleul | |
| 7,958,682 B2 * | 6/2011 | Elzein | 52/204.53 |
| 8,132,386 B2 * | 3/2012 | Leconte | 52/717.01 |
| 8,146,645 B2 * | 4/2012 | Pulcini et al. | 156/538 |
| 8,171,682 B2 * | 5/2012 | Pulcini et al. | 52/208 |
| 8,419,103 B2 * | 4/2013 | Spitler | 296/74 |
| 8,449,016 B2 * | 5/2013 | Timmermann | 296/146.15 |
| 2002/0100245 A1 * | 8/2002 | Billiu | 52/716.5 |
| 2003/0017309 A1 * | 1/2003 | Caldoro et al. | 428/194 |
| 2004/0004306 A1 | 1/2004 | Sawyer | |
| 2005/0076594 A1 * | 4/2005 | Warner | 52/459 |
| 2005/0091935 A1 | 5/2005 | Amano | |
| 2006/0000162 A1 * | 1/2006 | Choby et al. | 52/202 |
| 2006/0032181 A1 * | 2/2006 | Recker | 52/716.5 |
| 2006/0055211 A1 * | 3/2006 | Mack et al. | 296/216.09 |
| 2006/0236729 A1 | 10/2006 | Hollenhorst | |
| 2007/0029702 A1 | 2/2007 | Peterson | |
| 2007/0056965 A1 | 3/2007 | Jung | |
| 2007/0278819 A1 * | 12/2007 | Seksaria et al. | 296/146.6 |
| 2008/0107889 A1 * | 5/2008 | Fox | 428/319.7 |
| 2008/0127569 A1 * | 6/2008 | Boddy et al. | 49/502 |
| 2008/0196353 A1 * | 8/2008 | Debailleul et al. | 52/749.1 |
| 2008/0319133 A1 | 12/2008 | MacLachian | |
| 2009/0007511 A1 * | 1/2009 | Hause | 52/312 |
| 2009/0044467 A1 * | 2/2009 | Krochmal et al. | 52/204.593 |
| 2009/0127738 A1 * | 5/2009 | Smith et al. | 264/254 |
| 2009/0224644 A1 * | 9/2009 | Stocker et al. | 312/405 |
| 2009/0265999 A1 * | 10/2009 | Stefanelli | 49/490.1 |
| 2009/0295011 A1 * | 12/2009 | Smith et al. | 264/101 |
| 2009/0321977 A1 * | 12/2009 | Capriotti et al. | 264/101 |
| 2010/0065219 A1 * | 3/2010 | Paudice | 156/500 |
| 2010/0136348 A1 | 6/2010 | Nakata | |
| 2010/0244483 A1 * | 9/2010 | Erner et al. | 296/146.15 |
| 2010/0277946 A1 * | 11/2010 | Shallcross et al. | 362/581 |
| 2010/0300002 A1 * | 12/2010 | Ertl | 49/489.1 |
| 2011/0042848 A1 | 2/2011 | Ash | |
| 2011/0047905 A1 * | 3/2011 | Erner | 52/208 |
| 2011/0057465 A1 * | 3/2011 | Beau et al. | 296/1.08 |
| 2011/0121594 A1 * | 5/2011 | Kreye et al. | 296/1.08 |
| 2011/0138716 A1 * | 6/2011 | Schulte et al. | 52/208 |
| 2011/0139338 A1 * | 6/2011 | Fox | 156/70 |
| 2011/0179628 A1 | 7/2011 | Kreye | |
| 2011/0204671 A1 * | 8/2011 | Baratin | 296/93 |
| 2012/0025554 A1 * | 2/2012 | Hasegawa et al. | 296/1.08 |
| 2012/0126567 A1 * | 5/2012 | Timmermann | 296/96.21 |
| 2012/0137628 A1 * | 6/2012 | Brandt et al. | 52/716.5 |
| 2012/0153659 A1 * | 6/2012 | Senge | 296/93 |
| 2012/0153669 A1 * | 6/2012 | Nagwanshi et al. | 296/187.08 |
| 2012/0187722 A1 * | 7/2012 | Dawe et al. | 296/191 |
| 2012/0205940 A1 * | 8/2012 | Sitterlet et al. | 296/146.15 |
| 2013/0031865 A1 * | 2/2013 | Besedich et al. | 52/716.7 |
| 2013/0119696 A1 * | 5/2013 | Baggett | 296/96.21 |

FOREIGN PATENT DOCUMENTS

| | | |
|---|---|---|
| DE | 19818153 A1 | 10/1999 |
| DE | 202005010946 | 11/2005 |
| DE | 102005019414 | 5/2006 |
| DE | 102005054721 A1 | 5/2007 |
| EP | 122545 A2 * | 10/1984 |
| EP | 0371810 | 11/1989 |
| EP | 1621407 A1 | 2/2006 |
| EP | 1897713 | 3/2008 |
| FR | 2212221 | 12/1973 |
| GB | 2049010 A | 12/1980 |
| GB | 2321879 | 12/1998 |
| JP | 02262421 | 10/1990 |
| JP | 2003025837 | 1/2003 |
| WO | 8600262 | 1/1986 |
| WO | WO 9716325 A1 * | 5/1997 |
| WO | WO 9955547 A1 * | 11/1999 |
| WO | WO 9962730 A2 * | 12/1999 |
| WO | 2005044606 A2 | 5/2005 |
| WO | 2006010352 A1 | 2/2006 |
| WO | 2009146682 A1 | 12/2009 |
| WO | WO 2012080739 A1 * | 6/2012 |

* cited by examiner

VEHICLE GLAZING HAVING A TRIM MOUNTED THEREON

BACKGROUND OF THE INVENTION

1. Field of the Invention

The present invention relates to a vehicle glazing having a trim mounted thereon, and in particular it relates to a means of attachment of a trim to a glazing profile provided around at least a portion of the periphery of the glazing.

2. Description of the Related Art

Vehicle manufacturers strive to produce attractive vehicles, especially cars, since the aesthetic qualities of a car are important for commercial success. A number of features contribute to the overall appearance of a vehicle, one of which is the trim associated with the vehicle bodywork. In particular, trim may be provided on doors and windows, and is usually black or silver in colour. A finisher is an item of trim which may be mounted on a profile, other trim or on a glazing. Finishers may be made of metal, with a bright (i.e. silver) finish such as chrome-plating, but more usually they comprise plastic strips with a bright finish, possibly a metallised finish. Such finishers may be provided on fixed (i.e. non-opening) windows or opening windows. They are often added to fixed windows by being mounted on the glazing itself, rather than on the body of the vehicle, whereas trims for openable glazings are generally provided on the vehicle door or body.

A vehicle glazing comprises a pane of glazing material, such as glass, and associated components such as glazing profiles which are usually bonded to the glass. A glazing profile is a frame-like component made from resilient polymer material which is moulded or extruded. Glazing profiles have generally replaced weather-strips, gaskets and other sealing strips. The glazing profile is normally bonded to the pane of glass, usually extending around all or part of the periphery of the pane. The glazing profile fulfils several roles; it acts as a seal and spacer between the pane of glazing material and the vehicle bodywork, providing a controlled transition between glass and bodywork. It serves as a bed or foundation for adhesive, and may also control the position and spread of the adhesive. It may further have water management features. One technique for providing a glazing profile is to mould it in situ on the glass, which is known as edge encapsulation, or just "encapsulation" for short. In this technique, the glass is placed in an injection mould with its edge protruding into the moulding cavity, and then the polymer material is injected in liquid form, flowing into intimate contact with the glass before setting.

There are several different ways in which trim can be mounted on, or bonded to, a glazing. For example, when the glazing is encapsulated by a polymer frame (i.e. a glazing profile) around its periphery, the trim may be attached via the polymer frame. Alternatively, the trim may be bonded directly to the glazing by a layer or multiple points of adhesive along its length. A further possibility is that the trim may be clipped to the edge of the glazing, either directly, or via a holder that is bonded to the glazing.

U.S. Pat. No. 6,546,683 (corresponding to DE 198 18 153) relates to a window unit with a frame integrally formed on the window. A trim strip is fitted on the frame, and retained in place by a retaining clip which engages a retaining strip arranged on the outside of the frame. The retaining strip is formed by a prefabricated insert body on which the frame is integrally formed in an injection mould.

US 2009/0007511 (corresponding to DE 10 2005 054721) discloses a window unit having a decorative strip mounted thereon. The window unit comprises a frame with a number of cut-outs for a securing strip, to which the decorative strip is clipped.

SUMMARY OF THE INVENTION

One difficulty with bonding or clipping a trim to the edge of a glazing is ensuring that the trim and its fixing means are able to resist sufficient pull force for the trim to remain adhered to the glazing at all times in normal use. This is a particular problem for bonding with certain types of adhesive, or in the above example where a trim is clipped to a glazing profile, which relies on the clipping force together with friction and/or a mechanical interference fit to maintain the trim in place. As the popularity of so-called "bright trims" increases with vehicle manufacturers, it is desirable to find a simple and low-cost solution to the problem of fixing trims on vehicle glazings securely, i.e. with a sufficiently high pull-off force so that the trim remains in place despite the loosening effects of air flowing past the vehicle, together with associated eddies and vortices, not to mention wind, rain, snow and other weather effects, all exacerbated by vibration and minor impacts, and a wide range of temperature variation.

The present invention aims to address these problems by providing a vehicle glazing comprising a pane of glazing material having a glazing profile provided around at least a portion of the periphery of the pane, wherein a rigid insert is embedded in the glazing profile, and a trim is mounted on the glazing profile, the trim engaging the insert and being retained by it, characterised in that the insert is provided with at least one aperture through which the insert is engaged by at least one projection on the trim.

This engagement technique facilitates attachment of the trim, and provides significantly more secure retention of the trim. Preferably the glazing profile is moulded in situ directly on the pane. Advantageously, the insert is also moulded in situ on the pane, and the glazing profile and the insert are moulded in the same operation. This yields a more efficient manufacturing operation.

Preferably the insert comprises a strip-like main body, which is provided with at least one elongate strengthening member extending along the length of the strip-like main body. Alternatively or additionally, the strip-like main body may have at least one transverse strengthening member extending across its width. In addition to providing an improved retention mechanism, the insert may also contribute significantly to the stiffness of the glazing profile. This further assists retention of the trim, since the trim is less likely to become detached if the glazing profile which bears it is less susceptible to flexing.

Preferably the strip-like main body comprises at least one projecting member provided on the lower side of the strip-like main body to secure the insert in the glazing profile. This helps ensure that the insert is securely anchored in the glazing profile.

A preferred way for the trim to engage the insert is to provide the projection on the trim in the than of a hook on a flexible arm, which enables the projection to flex when being inserted into an aperture, and the hook engages with the insert when the trim is mounted on the glazing profile. This arrangement means that only a relatively small pushing force is required to engage the trim with the insert.

Preferably, the trim-retaining insert comprises a plastics material and a filler material. More preferably, the plastics material is polypropylene, and the filler material is a glass fibre filler material. An appropriate choice of filler material confers improved physical properties on the insert, for example increased stiffness, hardness and durability.

Preferably, the glazing profile is formed from a thermoplastic material.

Preferably, the trim is formed from one of the following materials: aluminium, stainless steel, polypropylene or polypropylene with a metallic film cover.

The invention also relates to a method of making a vehicle glazing comprising providing a pane of glazing material with a glazing profile around at least a portion of its periphery, a rigid insert being embedded in the glazing profile, mounting a trim on the glazing profile so that the trim engages the insert and is retained by it, characterised by providing at least one aperture in the insert and at least one projection on the trim, and advancing the trim into contact with the insert and the glazing profile, so that the projection on the trim engages the insert through the aperture.

Preferably the method comprises moulding the glazing profile in situ directly on the pane. More preferably, the method comprises also moulding the insert in situ on the pane, wherein the glazing profile and the insert are moulded in the same operation.

Preferably the insert comprises at least one projecting member and the glazing profile is composed of polymer material, the method additionally comprising injecting fluid polymer material and ensuring that it encases the projecting member to anchor the insert in the glazing profile when the polymer material sets.

According to a further aspect of the invention, a vehicle glazing is provided having a glazing profile provided around at least a portion of the periphery of the glazing and a trim mounted thereon, the glazing profile comprising a resilient polymer material adapted to form a seal with the body of a vehicle into which the vehicle glazing is fitted, and a rigid material, adapted to form a trim-retaining insert within the glazing profile, wherein the trim is adapted to engage with, and be retained by, the trim-retaining insert.

BRIEF DESCRIPTION OF THE DRAWINGS

The present invention will now be described by way of example only, and with reference to FIGS. 1, 3, 4 and 5 of the accompanying drawings.

FIG. 2 is a schematic sectional view of part of a known window, showing a known means of attaching trim to a window;

DETAILED DESCRIPTION OF THE PREFERRED EMBODIMENTS

Figure 1:
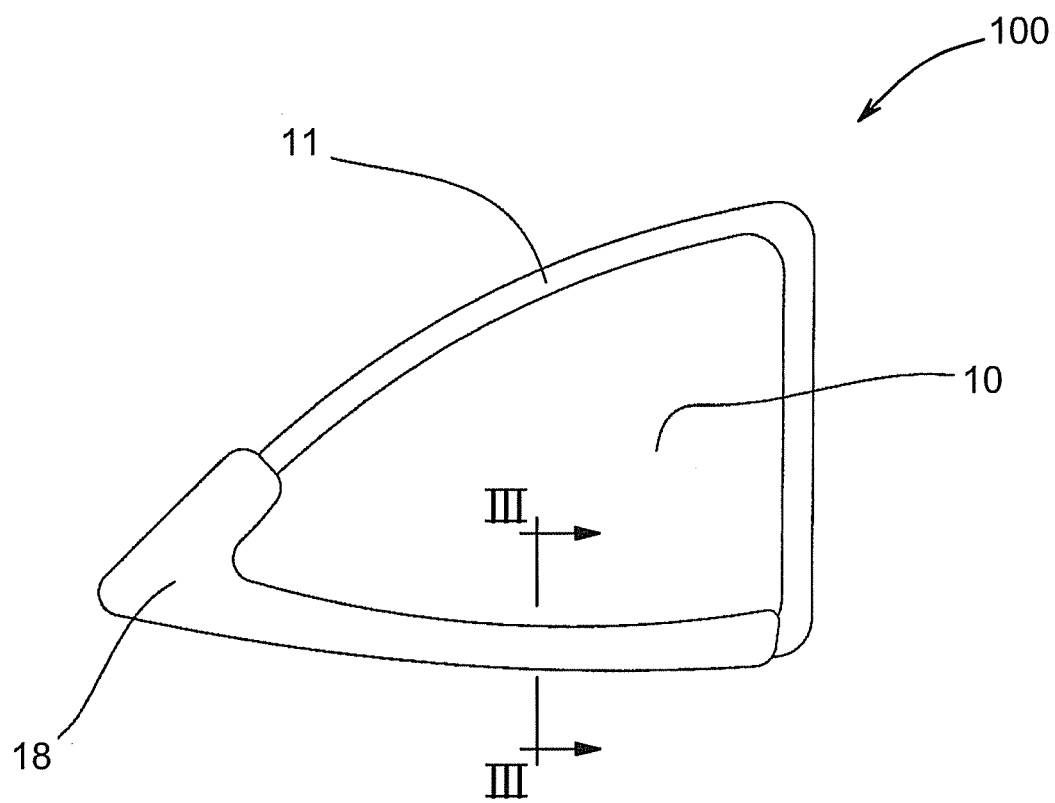
FIG. 1 is a schematic plan view illustrating the positioning of a trim on a vehicle glazing, such as a rear quarterlight.

FIG. 1 is a schematic plan view of a vehicle glazing in accordance with the invention, and illustrating the positioning of a trim on the glazing, as viewed from the outside of the vehicle. The glazing represents a rear quarterlight, but may be any automotive glazing as described below. The glazing 100 comprises a pane 10 of glazing material which is provided with an edge-encapsulated glazing profile 11 which extends around the periphery of the pane. In this example, the edge-encapsulated glazing profile 11 is provided around the entire periphery of the pane. The pane 10 may be composed of glass or a suitable transparent durable plastics material. The lower portion of the periphery of the pane 10 is also provided with a trim 18, which extends along the entire lower edge of the pane 10 and partway up one side. The glazing 100 is fitted into an aperture in the bodywork of a vehicle (not shown), and retained in place by adhesive (not shown).

Figure 2:
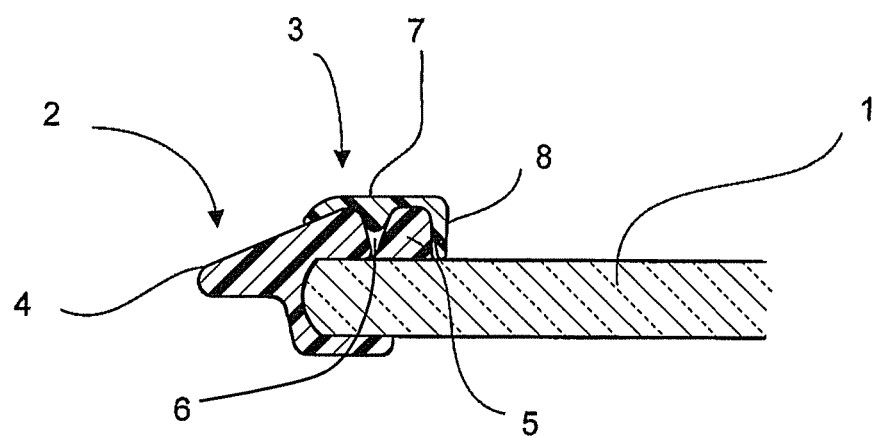
FIG. 2 is described to show the related prior art. In the drawings.

FIG. 2 is a schematic section of part of a known glazing 1. It comprises a glazing profile 2 provided with a lip portion 4, which bears against a vehicle body to form a watertight seal, and a dam portion 5 on what will form the interior surface of the glazing when fitted into a vehicle. The dam portion 5 is provided with a channel 6 running along its length, approximately parallel with the edge of the glazing 1. The trim 3 is formed with a projecting portion 7 along its longitudinal mid-line, which is adapted to be inserted into the channel 6 in the glazing profile 2 to form an interference fit and maintain the position of the trim 3 along the edge of the glazing 1. The trim 3 is also provided with an engagement portion 8 that fits over the inboard edge of the dam portion 5 of the glazing profile, also aiding in fixing the trim 3 in place. Unfortunately, in practice this arrangement does not hold the trim sufficiently reliably in place.

Rather than relying on an interference fit with an encapsulated glazing profile, clips or adhesives, the present invention provides an encapsulated glazing profile incorporating an insert having a greatly improved trim-retaining capability, as described in more detail below. The insert is moulded from a material that becomes rigid on curing, to provide mechanical strength and stability for the trim when mounted on the glazing. The encapsulated glazing profile is generally formed of a resilient polymer material such as single or two-component polyurethanes, PUR, TPE (thermoplastic elastomer), PVC (polyvinyl chloride) or other thermoplastic material suitable for injection moulding processes. The encapsulated glazing profile is adapted to form a seal with the body of a vehicle into which the vehicle glazing is fitted, and any trim used in conjunction with the rigid trim-retaining insert is adapted to engage with, and be retained by, the insert.

Figure 3:
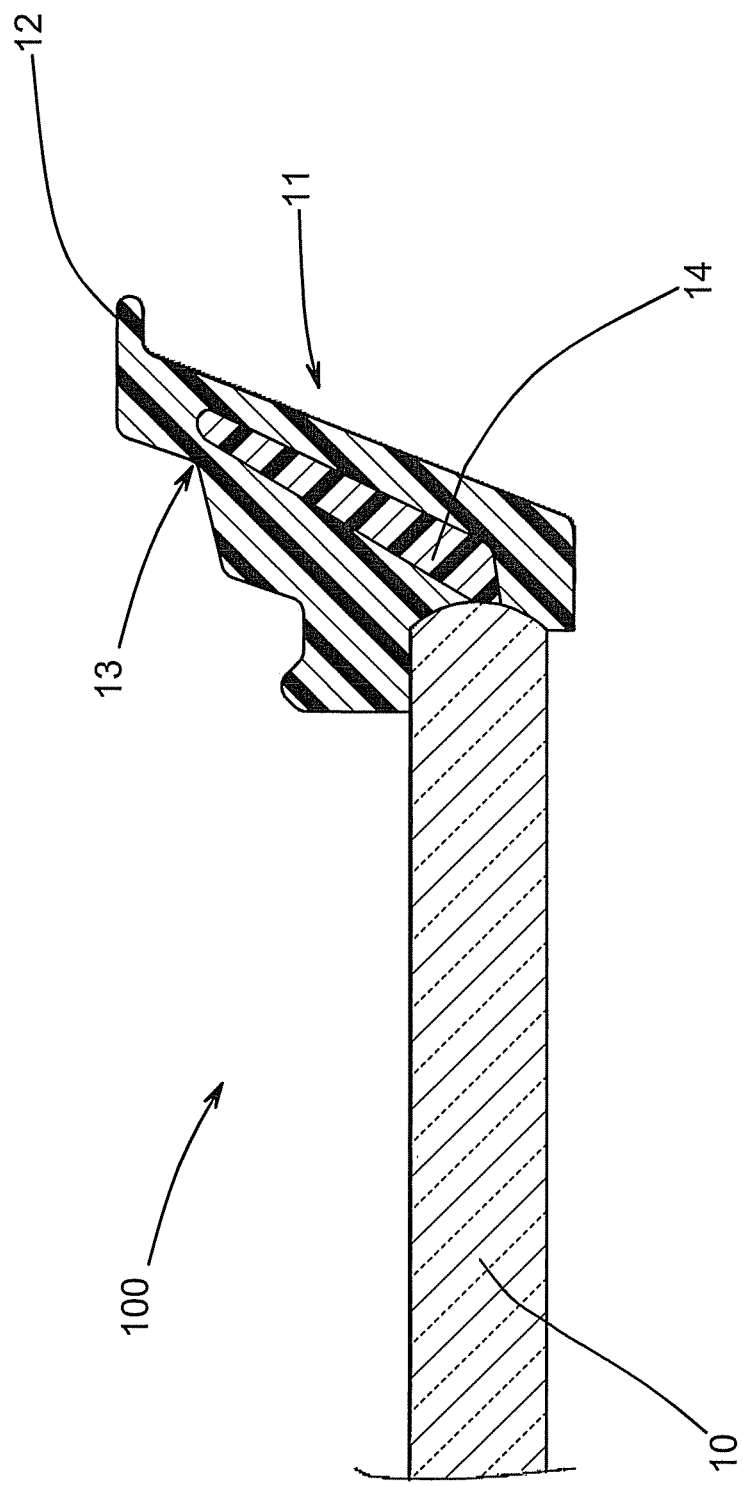
FIG. 3 is a schematic section on line of FIG. 1 showing part of a glazing having a moulded glazing profile and a rigid insert in accordance with the present invention.

FIG. 3 is a schematic section of part of the glazing of FIG. 1, having an encapsulated glazing profile and a trim-retaining insert in accordance with the present invention (the trim itself is omitted). As previously described, the glazing 100, in this example comprising a pane 10 in the form of a single ply of toughened glass, is provided with an encapsulated glazing profile 11 around at least a portion of its periphery. In the drawing, the upper face of the pane of glass represents the outside of the vehicle. The encapsulated glazing profile 11 is provided on its outward-facing side with a flexible lip portion 12 and a locating surface 13 which receives the trim. Such glazings are normally fixed to the vehicle body by adhesive bonding, and the adhesive (not shown) is provided on the inside face of the glazing, i.e. the lower face as shown in the drawing, or on the inward-facing side of the glazing profile.

Within the encapsulated glazing profile 11 is provided a rigid trim-retaining insert 14. The insert 14 is in contact with the edge of the glazing 10, and encased within the encapsulated glazing profile 11 in an approximately central position, running parallel with the edge of the glazing 10. The insert is embedded in the glazing profile, and may be substantially or wholly surrounded by it, e.g. enclosed or encased within the glazing profile. Preferably the insert is positioned below the surface of the glazing profile, i.e. the insert is set back below the surface of the glazing profile. The insert extends around the periphery of the pane, within the glazing profile, for a distance which approximately corresponds with the length of the trim to be attached, i.e. the insert is approximately coextensive with the trim. A number of short insert segments may be used to make up the total length of insert required. Apart from its principal function of retaining an item of trim, the insert provides additional benefits such as stiffening the glazing profile, and reducing shrinkage in the glazing profile as a result of setting or curing of the polymer. The rigid trim-retaining insert 14 is shown in more detail in FIG. 4.

Figure 4:
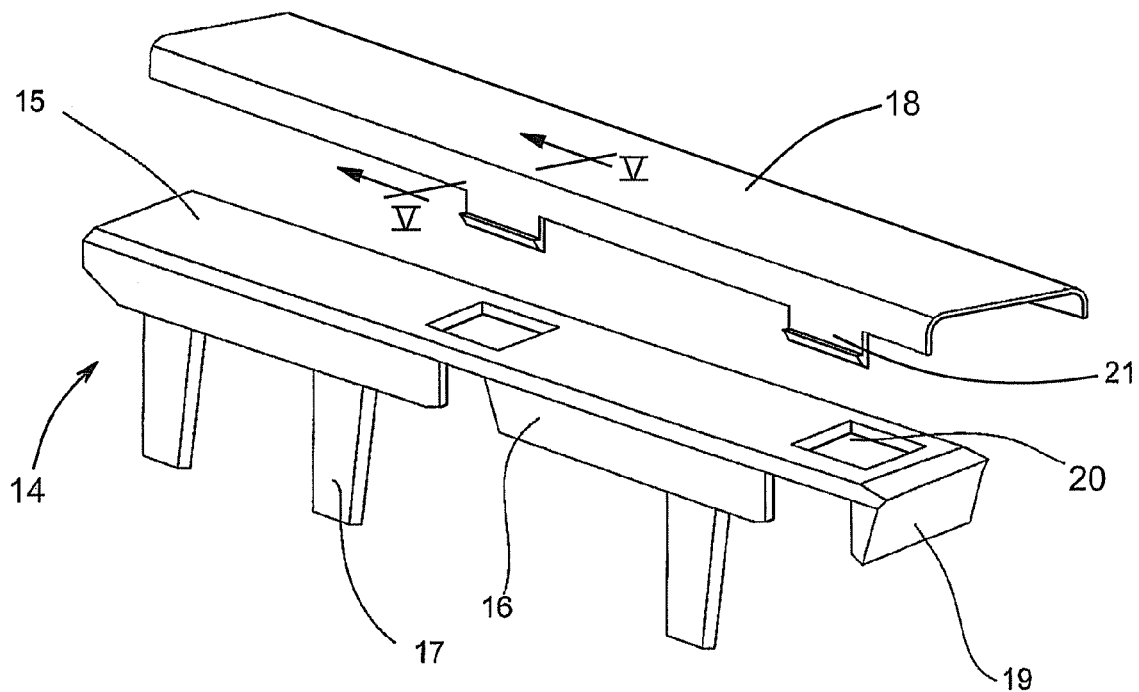
FIG. 4 is an exploded schematic perspective view showing a rigid insert in accordance with the present invention and a trim.

FIG. 4 is an exploded schematic perspective view showing a trim-retaining insert in accordance with the present invention and a trim. The glazing profile has been omitted to show the trim more clearly. The trim-retaining insert 14 is in the shape of a generally elongate member, having a strip-like main body 15 with one or more projecting members 17. The insert is provided with at least one elongate strengthening member 16 in the form of a reinforcing rib, which extends along the elongated dimension of the strip-like main body 15 of the insert, i.e. parallel to its longitudinal axis. Preferably, a strengthening member 16 extends along each of the two long edges of the lower side (as seen in the drawing) of the strip-like main body 15. The elongate strengthening member 16 provides a degree of resistance to bending to the trim-retaining insert 14 along its length, i.e. it stiffens the insert.

At least one projecting member 17 is also provided on the lower side of the strip-like main body 15. Each projecting member 17 is in the shape of a finger, prong or fin, and acts as a securing member for the insert, anchoring it within the glazing profile. The glazing profile is moulded in a mould having a moulding cavity into which the pane of glass extends, and fluid polymer material is injected into the mould, ensuring that the fluid polymer material encases the projecting member(s) to anchor the insert in the glazing profile when the polymer material sets. As a result, the at least one projecting member 17 extends into the body of the encapsulated glazing profile 11, helping to secure the trim-retaining insert 14 in place.

The presence of the projecting members 17 on rigid insert 14 also provides additional mechanical strength and stiffness to the assembly comprising the encapsulated glazing profile 11 and insert 14. This is beneficial because reduced flexing of the profile aids in retaining trim 18.

A further strengthening member 19 is provided transversely across each end of the strip-like main body 15 of the trim-retaining insert 14, i.e. at right angles to the longitudinal rib 16. This acts to provide resistance to bending of the strip-like main body 15 of the trim-retaining insert 14 across its width.

In addition to the various strengthening and securing members described above, the main body 15 of the trim-retaining insert 14 is provided with a number of perforations or apertures 20, each adapted to receive a corresponding projection 21 in the form of a lug portion provided on the underside of the trim 18, i.e. the side which is not visible after fitting. This design enables fitting the trim to be accomplished by a simple push fit of the trim 18 onto the trim-retaining insert 14, and yet, once engaged, the lug portion is highly resistant to detachment. In order to enable the projecting lugs 21 to engage with the apertures 20, correspondingly aligned through-holes (not shown) are provided in the encapsulated glazing profile 11 to provide access. The projections 21 pass through the through-holes to engage in the apertures.

Each aperture 20 in the insert may itself take the form of a through-hole, or alternatively it may represent the mouth of a socket-like recess, which is sufficiently deep to receive the projection 21, and incorporates a step to provide an engaging surface for the projection 21. In practice there will normally be a plurality of apertures arranged at intervals in the strip-like main body of the insert, forming a row of apertures. The apertures face in the direction from which the trim is attached, as do the through-holes in the glazing profile; as a result the apertures usually face upwards or outwards or a combination of the two. The apertures need not be square as shown; they may take a variety of forms, for instance they may be elongate, e.g. rectangular, with the direction of elongation being parallel to the longitudinal axis of the insert. In particular, the apertures may be in the shape of slots.

Although FIG. 4 depicts a short straight section of trim 18 and corresponding insert 14, the trim and insert may be much longer, and incorporate curves or corners, as shown in FIG. 1.

Figure 5:
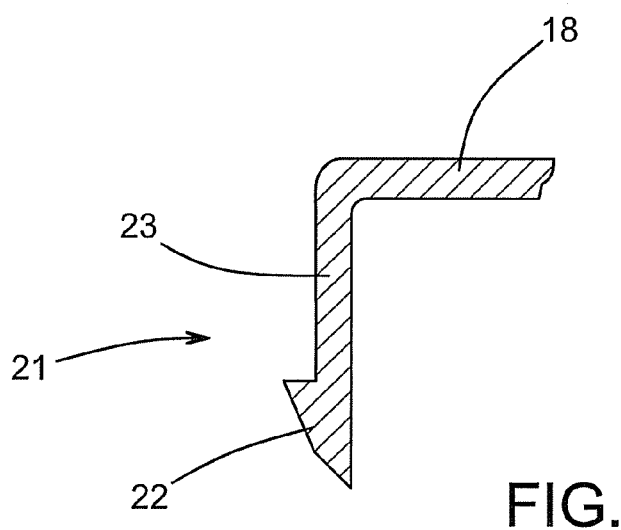
FIG. 5 is a schematic cross-section on line V-V of FIG. 4 showing details of the retaining means provided on the trim to engage with the rigid insert in accordance with the present invention.

FIG. 5 is a schematic cross-section showing details of the retaining means provided on the trim 18 to engage with the trim-retaining insert 14 in accordance with the present invention. Each projecting lug portion 21 on the trim is provided with a hook 22 on a resilient flexible arm 23, which enables the lug portion 21 to flex when being inserted into an aperture 20, and then provides a restoring force against the side of the aperture 20, such that the hook 22 engages with the underside of the aperture 20, preventing removal of the trim 18 by means of a vertical pull force. The lug portion illustrated is shown extending downwards from the left-hand side of the trim as viewed in FIGS. 4 and 5; however, in a variant, a second lug portion may be provided extending downwards from the right-hand side of the trim. Such a second lug portion may engage with the insert through the same aperture as the first; alternatively, separate apertures may be provided for each lug portion, in which case the apertures may be in the shape of elongate slots.

The insert 14 may be co-moulded, over-moulded, moulded separately or extruded and die cut. Preferably, the insert 14 is formed as part of the injection moulding process used to form the encapsulated glazing profile 11. For example, the encapsulation mould used to mould the encapsulated glazing profile 11 may be provided with means to mould the trim-retaining insert 14 via a separate material feed to the same or different injection points or gates, such that the trim-retaining insert 14 and the encapsulated glazing profile are co-moulded. Normally, different polymer materials are used to mould the glazing profile and the insert, and these materials may be injected sequentially or concurrently. If alternatively the insert is prefabricated in a different moulding or extrusion operation, care needs to be taken to ensure that the insert is accurately located in the encapsulation mould in which the glazing profile is moulded.

Preferably, the insert 14 is formed from a rigid material, such as polypropylene, with a glass fibre filler, and optionally a colourant, such as talc. A suitable material combination is polypropylene with 30 wt % glass fibre filler material. The addition of filler increases the stiffness, rigidity, hardness and durability of the insert. It assists in retaining the shape of the functional areas (e.g. the apertures 20) by reducing deformation. This allows a slimmer design of insert to be used, which is advantageous, since the insert can then be satisfactorily embedded in slim glazing profiles. Incorporation of a colourant in the insert is not generally needed for aesthetic purposes since the insert is not visible after attachment of the trim. However, it may be useful to use different colours to distinguish left and right-handed parts for example, or to ensure that the insert is clearly visible in the factory before attachment of the trim, thereby facilitating detection of missing inserts in quality control checks.

The trim 18 is preferably formed from one of a plastics material, such as polypropylene, or a metallic material, such as aluminium or stainless steel. So-called bright trims may also be formed from a plastics material with a film coating on the upper exposed surface, such as a chrome film.

Although the example described above is in terms of a rear quarter side glazing, the present invention is suitable for use with any glazing intend for fitting in a vehicle, such as a windscreen, a backlight (rear window), a rooflight (roof window), a sidelight, a front quarter, vent or other glazing requiring a trim to be fitted by a vehicle manufacturer. The glazing material may be any material used in vehicle glazings, in particular, toughened glass or laminated glass, and the glass may be clear, tinted and/or coated.

What is claimed is:

1. A vehicle glazing comprising a pane of glazing material having a glazing profile provided around at least a portion of a periphery of the pane, wherein the glazing profile is moulded in situ directly on the pane, wherein a rigid insert is embedded in the glazing profile, and a separate trim is mounted on the glazing profile, the trim engaging the insert and being retained by the insert, wherein the insert is provided with at least one aperture through which the insert is engaged by at least one projection on the trim, and wherein the insert comprises a main body in the form of a strip, which is provided with at least one elongate strengthening member extending along a length of the main body and at least one transverse strengthening member extending across a width of the main body.

2. A vehicle glazing comprising a pane of glazing material having a glazing profile edge-encapsulated around at least a portion of a periphery of the pane, wherein the glazing profile is moulded in situ directly on the pane, wherein a rigid insert that is separate from the glazing profile is embedded in the glazing profile, and a separate trim finisher is mounted on the glazing profile, the trim finisher engaging the insert and being retained by the insert, wherein the insert is provided with at least one aperture through which the insert is engaged by at least one projection on the trim finisher, and wherein the projection on the trim finisher comprises a hook on a flexible arm, and the hook engages with the insert when the trim finisher is mounted on the glazing profile.

3. The vehicle glazing according to claim 2, wherein the hook on the flexible arm enables the projection to flex when being inserted into the at least one aperture.

4. The vehicle glazing according to claim 2, wherein the insert is moulded in situ on the pane, and the glazing profile and the insert are moulded in the same operation.

5. The vehicle glazing according to claim 2, wherein the insert comprises a plastics material and a filler material.

6. The vehicle glazing according to claim 2, wherein the insert comprises a main body in the form of a strip, which is provided with at least one transverse strengthening member extending across a width of the main body.

7. The vehicle glazing according to claim 2, wherein the insert comprises a main body in the form of a strip, which is provided with at least one elongate strengthening member extending along a length of the main body.

8. The vehicle glazing according to claim 7, wherein the main body comprises at least one projecting member provided on a lower side of the main body to secure the insert within the glazing profile.

9. The vehicle glazing according to claim 2, wherein the insert comprises a main body in the form of a strip, which is provided with at least one elongate strengthening member extending along a length of the main body and at least one transverse strengthening member extending across a width of the main body.

\* \* \* \* \*